United States Patent
O'Meallie et al.

(10) Patent No.: US 11,193,855 B2
(45) Date of Patent: Dec. 7, 2021

(54) AUTOMATIC TESTING OF ELECTRIC MACHINE DISCONNECT

(71) Applicants: Rolls-Royce Corporation, Indianapolis, IN (US); Rolls-Royce North American Technologies, Inc., Indianapolis, IN (US)

(72) Inventors: Paul O'Meallie, Brownsburg, IN (US); Alan W. Smith, Greenwood, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 129 days.

(21) Appl. No.: 16/592,055

(22) Filed: Oct. 3, 2019

(65) Prior Publication Data
US 2021/0102869 A1    Apr. 8, 2021

(51) Int. Cl.
*G01M 15/14*    (2006.01)
(52) U.S. Cl.
CPC .................... *G01M 15/14* (2013.01)
(58) Field of Classification Search
CPC ...................................................... G01M 15/14
See application file for complete search history.

(56) References Cited

U.S. PATENT DOCUMENTS

| | | | |
|---|---|---|---|
| 6,167,996 B1 * | 1/2001 | Huber | F16H 59/56 192/30 W |
| 2005/0192155 A1 * | 9/2005 | Duskunovic | F16H 61/061 477/166 |
| 2006/0260323 A1 | 11/2006 | Moulebhar | |
| 2008/0207393 A1 * | 8/2008 | Minami | F16D 48/06 477/77 |
| 2009/0247363 A1 * | 10/2009 | Nagami | F16D 48/066 477/181 |
| 2011/0295455 A1 | 1/2011 | Schenk | |
| 2014/0100748 A1 * | 4/2014 | Kim | F16D 48/066 701/68 |

(Continued)

FOREIGN PATENT DOCUMENTS

DE    102011054480 A1    4/2013

OTHER PUBLICATIONS

Extended European Search Report from counterpart EP Application 20194605.0 dated Jan. 28, 2021, 9 pgs.

(Continued)

*Primary Examiner* — Eric S. McCall
(74) *Attorney, Agent, or Firm* — Shumaker & Sieffert, P.A.

(57) ABSTRACT

An example method includes obtaining a representation of a change in rotational speed of an electric machine; obtaining a representation of an expected change in rotational speed of the electric machine; and determining, based on the obtained representation of the change in rotational speed of the electric machine and the representation of an expected change in rotational speed of the electric machine, whether a disconnect device has failed, wherein, when operating in an engaged state, the disconnect device is configured to couple rotational mechanical energy between the electric machine and a rotating device, and wherein, when operating in a disengaged state, the disconnect device is not configured to couple rotational mechanical energy between the electric machine and the rotating device.

18 Claims, 6 Drawing Sheets

(56) References Cited

U.S. PATENT DOCUMENTS

| | | | |
|---|---|---|---|
| 2017/0234420 A1* | 8/2017 | Cashatt | F16H 45/02 |
| | | | 701/67 |
| 2017/0259804 A1* | 9/2017 | Lee | B60W 30/186 |
| 2018/0050680 A1* | 2/2018 | Kim | B60W 20/20 |
| 2019/0088043 A1* | 3/2019 | Henson | G07C 5/0841 |
| 2020/0096062 A1* | 3/2020 | Smith | F16D 48/02 |
| 2020/0309258 A1* | 10/2020 | McKinzie | F16H 61/0213 |

OTHER PUBLICATIONS

Response to Extended European Search Report from counterpart EP Application 20194605.0 dated Jan. 28, 2021, filed Aug. 23, 2021, 62 pgs.

* cited by examiner

AUTOMATIC TESTING OF ELECTRIC MACHINE DISCONNECT

TECHNICAL FIELD

This disclosure relates to the testing of a mechanical disconnect (e.g., clutch) between an electrical machine and a rotating device.

BACKGROUND

One method to produce electrical power in a vehicle or system is through the use of a prime mover or internal combustion engine to drive an electric generator. A gas turbine engine is a type of internal combustion engine or prime mover that may be used to power an aircraft, another moving vehicle, or an electric generator. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive the compressor, a propulsor, other devices, and loads including an electric generator. The propulsor may use the energy from the rotating shaft to provide propulsion for the system.

SUMMARY

In one example, a system includes an electric machine; a rotating device; a disconnect device controllable to operate in a plurality of states, wherein, when operating in an engaged state of the plurality of states, the disconnect device is configured to couple rotational mechanical energy between the electric machine and the rotating device, and wherein, when operating in a disengaged state of the plurality of states, the disconnect device is not configured to couple rotational mechanical energy between the electric machine and the rotating device; and a controller configured to test operation of the disconnect device, wherein, to test operation of the disconnect device, the controller is configured to: obtain a representation of a change in rotational speed of the electric machine; obtain a representation of an expected change in rotational speed of the electric machine; and determine, based on the obtained representation of the change in rotational speed of the electric machine and the representation of an expected change in rotational speed of the electric machine, whether the disconnect device has failed.

In another example, a method includes obtaining a representation of a change in rotational speed of an electric machine; obtaining a representation of an expected change in rotational speed of the electric machine; and determining, based on the obtained representation of the change in rotational speed of the electric machine and the representation of an expected change in rotational speed of the electric machine, whether a disconnect device has failed, wherein, when operating in an engaged state, the disconnect device is configured to couple rotational mechanical energy between the electric machine and a rotating device, and wherein, when operating in a disengaged state, the disconnect device is not configured to couple rotational mechanical energy between the electric machine and the rotating device.

In another example, a computer-readable storage medium stores instructions that, when executed, cause a controller to: obtain a representation of a change in rotational speed of an electric machine; obtain a representation of an expected change in rotational speed of the electric machine; and determine, based on the obtained representation of the change in rotational speed of the electric machine and the representation of an expected change in rotational speed of the electric machine, whether a disconnect device has failed, wherein, when operating in an engaged state, the disconnect device is configured to couple rotational mechanical energy between the electric machine and a rotating device, and wherein, when operating in a disengaged state, the disconnect device is not configured to couple rotational mechanical energy between the electric machine and the rotating device.

The details of one or more examples are set forth in the accompanying drawings and the description below. Other features, objects, and advantages will be apparent from the description and drawings, and from the claims.

DETAILED DESCRIPTION

Electrical machines may be used to provide energy to, or extract energy from, rotating devices. As one example, an electrical generator may convert rotational mechanical energy extracted from a combustion motor into electrical energy. As another example, an electrical motor may provide rotational mechanical energy to assist with starting a combustion motor. As another example, an electrical motor may provide rotational mechanical energy to drive a propulsor (e.g., fan, propeller, etc.) of a vehicle.

Systems can include a mechanical disconnect device (e.g., a clutch) between an electrical machine and a rotating device. For instance, a vehicle may include a clutch between an electrical machine and a combustion motor to enable selective coupling of mechanical energy between the electrical machine and the combustion motor. However, like any device, mechanical disconnect devices may sometimes fail. For instance, a clutch may become stuck in an engaged state such that an electrical machine cannot be mechanically decoupled from a combustion motor. Similarly, a clutch may become stuck in a disengaged state such that the electrical machine cannot be mechanically coupled to the combustion motor.

In accordance with one or more techniques of this disclosure, a system may include functionality to perform self-testing to determine whether a disconnect device that selectively couples an electrical machine to a rotating device is operating properly. The electrical machine may experience different rates of change in rotational speed (e.g., changes in angular velocity) depending on whether the electrical machine is coupled to the rotating device or not. For instance, assuming an identical application of power, an electrical motor may experience a lower rate of change in rotational speed (e.g., slower acceleration) when coupled to provide energy to a rotating device than when uncoupled from the rotating device. The lower rate of change when uncoupled versus when coupled to the rotating device may be the result of the rotational moment of inertia of the total rotating object being higher when the electrical machine is coupled to the rotating device. As such, particularly in examples where the rotating device independently has a significantly higher (e.g., an order of magnitude greater) rotational moment of inertia than the electrical machine, there may be a significant difference in the change in rotational speed of the electrical machine depending on whether the electrical machine is coupled to the rotating device.

A controller may take advantage of this difference to determine whether the disconnect device that selectively couples the electrical machine to the rotating device is operating properly. For instance, the controller may determine a current operational setting of the disconnect device (e.g., engaged or disengaged), and obtain an expected change in rotational speed of the electrical machine for the current operational setting. As an example, where the controller determines that the disconnect device is currently set to be engaged, the controller may obtain (e.g., from memory or from a model of the system or from characteristic data of the system stored in memory) an expected change in rotational speed of the electrical machine for a particular period of time (e.g., X radians/second). The controller may obtain a measurement of an actual change in rotational speed of the electrical machine and compare the obtained expected change in rotational speed with the obtained actual change in rotational speed. If the obtained expected change in rotational speed matches (e.g., is within a threshold of) the obtained actual change in rotational speed, the controller may determine that the disconnect device is operating properly. However, if the obtained expected change in rotational speed does not match (e.g., is not within the threshold of) the obtained actual change in rotational speed, the controller may determine that the disconnect device is not operating properly.

Figure 1:
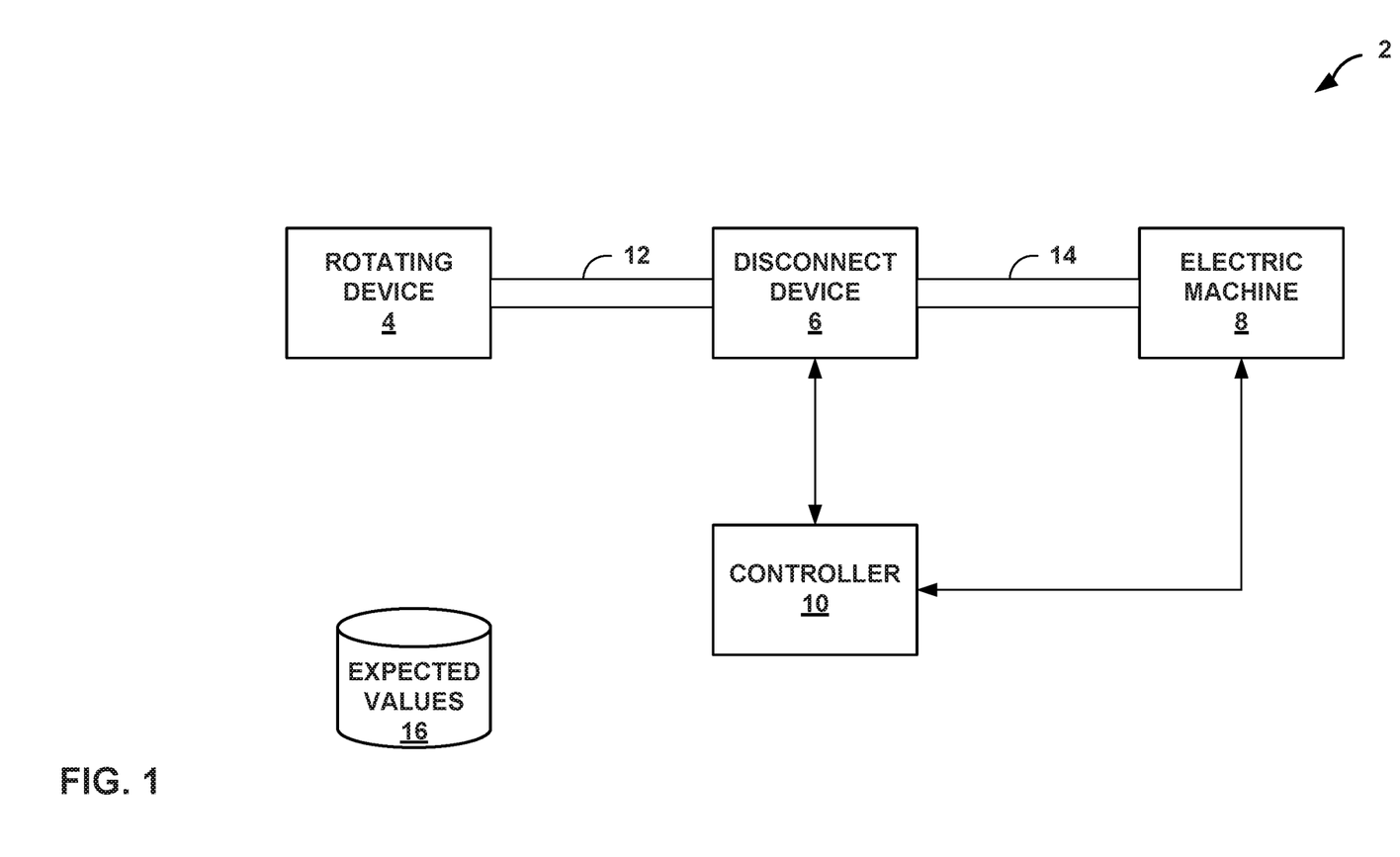
FIG. 1 is a conceptual block diagram illustrating further details of an example system, in accordance with one or more techniques of this disclosure.

FIG. 1 is a conceptual block diagram in accordance with one or more techniques of this disclosure. As shown in FIG. 1, system 2 includes rotating device 4, disconnect device 6, electric machine 8, and controller 10. System 2 may be included in any vehicle, such as an aircraft, a wheeled or tracked vehicle, a locomotive, or a watercraft. In other examples, system 2 may be included in a building or other non-vehicle structure. System 2 may include additional components not shown in FIG. 1 or may not include some components shown in FIG. 1.

Rotating device 4 may be a device including one or more rotating components. Examples of rotating device 4 include, but are not limited to, combustion motors (e.g., gas-turbines, reciprocating motors, etc.), vehicle propulsors (e.g., fans, propellers, rotors, or any other thrust producing device), or any other device that may provide rotational mechanical energy to, or receive mechanical energy from, an electric machine. As shown in FIG. 1, rotating device 4 may be coupled to shaft 12. For instance, rotational mechanical energy may be provided to, or extracted from rotating device 4 via shaft 12.

Electric machine 8 may be capable of converting rotational mechanical energy into electrical energy and/or converting electrical energy into rotational mechanical energy. Examples of electric machine 8 include, but are not limited to, electric motors, electric generators, and dual function motor-generators. In some examples, electric machine 8 may be referred to as an electric starter/generator (ESG). Electric machine 8 may be a direct current (DC) electric machine (e.g., a DC motor or a DC generator), or an alternating current (AC) electric machine (e.g., an AC motor or an AC generator). In some examples, electric machine 8 may be a field wound electric machine. In some examples, electric machine 8 may be a permanent magnet electric machine. As shown in FIG. 1, electric machine 8 may be coupled to shaft 14. For instance, rotational mechanical energy may be provided to, or extracted from electric machine 8 via shaft 14.

Where system 2 is included in a vehicle, electric machine 8 may perform one or more operations to support operation of the vehicle. As one example, where rotating device 4 includes a combustion motor, electric machine 8 may operate as a starter that provides rotational mechanical energy to start the combustion motor. As another example, where rotating device 4 includes a combustion motor, electric machine 8 may operate as a generator that generates electrical power using rotational mechanical energy extracted from the combustion motor. As another example, where rotating device 4 includes a propulsor of the vehicle, electric machine 8 may operate as a motor that provides rotational mechanical energy to drive the propulsor. As another example, where rotating device 4 includes a propulsor of the vehicle, electric machine 8 may operate as a generator that generates electrical energy using rotational mechanical energy extracted from the propulsor.

Disconnect device 6 may be configured to selectively transfer rotational mechanical energy between rotating device 4 and electric machine 8. For instance, disconnect device 6 may be configured to operate in a plurality of states, including an engaged state and a disengaged state. When operating in the engaged state, disconnect device 6 may couple rotational mechanical energy between electric machine 8 and rotating device 4 (e.g., transmit rotational mechanical energy from electric machine 8 to rotating device 4 and/or transmit rotational mechanical energy from rotating device 4 to electric machine 8). For instance, in the engaged state, disconnect device 6 may close a mechanical linkage between shaft 12 and shaft 14.

When operating in the disengaged state, disconnect device 6 may not couple rotational mechanical energy between electric machine 8 and rotating device 4. For instance, in the disengaged state, disconnect device 6 may open a mechanical linkage between shaft 12 and shaft 14. In some examples, disconnect device 6 may be referred to as a clutch. Disconnect device 6 may be actively controllable (e.g., as opposed to non-actively controllable disconnect devices, such as overrunning clutches or freewheels). For instance, disconnect device 6 may activate in the engaged or disengaged state based on a control signal (e.g., received from controller 10 or another component of system 2).

Controller 10 may be configured to perform one or more operations to control operation of various components of system 2. For instance, controller 10 may be configured to control operation of disconnect device 6. As one example, controller 10 may output a signal to disconnect device 6 that causes disconnect device 6 to operate in the engaged state. For instance, where rotating device 4 includes a combustion engine and electric machine 8 is configured to operate as a starter, controller 10 may cause disconnect device 6 to operate in the engaged state during start of the combustion engine. As another example, controller 10 may output a signal to disconnect device 6 that causes disconnect device 6 to operate in the disengaged state. For instance, where rotating device 4 includes a combustion engine and electric machine 8 is configured to operate as a generator, controller 10 may cause disconnect device 6 to operate in the disengaged state in response to a fault being detected in the generator (or an electrical system fed by the generator).

Examples of controller 10 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 10 includes software or firmware, controller 10 further include any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controller 10 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 10 (e.g., may be external to a package in which one or more of controller 10 is housed).

In general, it may be desirable to be able to determine whether disconnect device 6 is operating properly. For instance, it may be desirable to determine in advance whether disconnect device 6 will cease coupling rotational mechanical energy between rotating device 4 and electric machine 8 when commanded to switch from the engaged state to the disengaged state. In particular, where rotating device 4 includes a combustion engine and electric machine 8 is configured to operate as a generator, it may be desirable to determine in advance whether disconnect device 6 will cease coupling rotational mechanical energy between the combustion engine and the generator when commanded to switch from the engaged state to the disengaged state (e.g., in response to a fault being detected in the generator or an associated electrical network).

In accordance with one or more techniques of this disclosure, controller 10 may perform testing to determine whether or not disconnect device 6 is operating properly. To perform the testing of disconnect device 6, controller 10 may determine a current operational setting of disconnect device 6. For instance, controller 10 may determine whether disconnect device 6 is currently set to be engaged or disengaged. Controller 10 may obtain (e.g., from a memory device, such as expected values 16) an expected change in rotational speed of electric machine 8 for the current operational setting. For instance, where disconnect device 6 is currently set to operate in the engaged state, controller 10 may obtain an expected change in rotational speed of electric machine 8 for a particular period of time (e.g., X radians/second). In some examples, controller 10 may directly obtain the expected change in rotational speed. For instance, controller 10 may obtain a value of the expected change in rotational speed from expected values 16. In some examples, controller 10 may indirectly obtain the expected change in rotational speed. For instance, controller 10 may obtain a model of a rotational system that corresponds to electrical machine 8, and derive the expected change in rotational speed based on the model.

Controller 10 may obtain a measurement of an actual change in rotational speed or acceleration of electric machine 8. Controller 10 may obtain the measurement in a number of ways. As one example, controller 10 may determine the change in rotational speed of electric machine 8 based on measurements of rotational speed of electric machine 8 obtained from a speed sensor (e.g., encoder, resolver, etc.) included in or attached to electric machine 8 (or shaft 14). As another example, controller 10 may determine the change in rotational speed of electric machine 8 based on an alternating voltage at an output of electric machine 8. In some examples, controller 10 may determine the change in rotational speed based on multiple measurements of speed. For instance, controller 10 may obtain a first measurement speed$_{start}$ at a first time t$_{start}$ and a second measurement speed$_{end}$ at a second time t$_{end}$. Based on the first measurement and the second measurement, controller 10 may calculate an acceleration (e.g., change in rotational speed) of electric machine 8. For instance, controller 10 may determine the acceleration in accordance with the following equation:

$$accel = \frac{\Delta v}{\Delta t} = \frac{\text{speed}_{end} - \text{speed}_{start}}{\text{time}_{end} - \text{time}_{start}}$$

Controller 10 may compare the obtained expected change in rotational speed with the obtained actual change in rotational speed. If the obtained expected change in rotational speed matches (e.g., is within a threshold of) the obtained actual change in rotational speed, controller 10 may determine that disconnect device 6 is operating properly. However, if the obtained expected change in rotational speed does not match (e.g., is not within the threshold of) the obtained actual change in rotational speed, controller 10 may determine that disconnect device 6 is not operating properly.

In some examples, controller 10 may cause electric machine 8 to output power to, or extract power from, shaft 14 during the testing period (e.g., the time between the first time t$_{start}$ and the second time t$_{end}$). As one example, where electric machine 8 operates as an electric motor, controller 10 may cause electric machine 8 to output power to shaft 14 during the testing period. As another example, where electric machine 8 operates as a generator, controller 10 may cause electric machine 8 to extract power from shaft 14 (e.g., to generate electrical energy) during the testing period. The outputting or extracting of power may increase the signal strength of the change in rotational speed relative to the expected change in rotational speed. In particular, by outputting power to (or extracting power from) shaft 14, differences between the expected change in rotational speed and actual change in rotational speed may become apparent without an unduly long testing period.

While described above as being performed based on rotational speed, controller 10 may perform the testing of disconnect device 6 based directly on rotational speed, or based on a representation of the rotational speed. As one example, controller 10 may perform the testing of disconnect device 6 by measuring inertia using speed change with variable time and energy input. As another example, controller 10 may perform the testing of disconnect device 6 by measuring time with known speed change and power input (e.g., energy input). As another example, controller 10 may perform the testing of disconnect device 6 by measuring power input with known speed change and time. As another example, controller 10 may perform the testing of disconnect device 6 by measuring speed change with known time and power input. Controller 10 may utilize the following equation to relate the aforementioned speed change, power input, and time:

$$E = \text{PowerInput} * \text{time} = \frac{1}{2} * \text{RotationalMomentofInteria} * (\text{speed}_{end} - \text{speed}_{start})^2$$

where ($\text{speed}_{end}$-$\text{speed}_{start}$) represents the speed change, PowerInput represents the power input, and RotationalMomentofInteria represents the rotational moment of inertia of electric machine 8 and shaft 14.

Figure 2A:
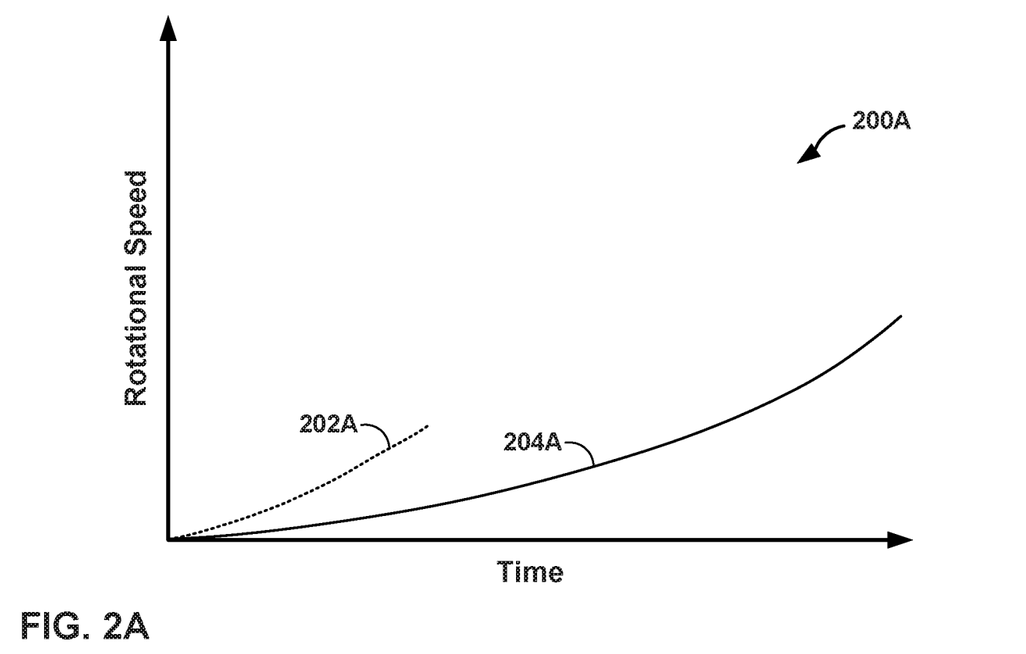
FIGS. 2A and 2B are graphs illustrating changes in rotational speed as a function of time, in accordance with one or more techniques of this disclosure.
Figure 2B:
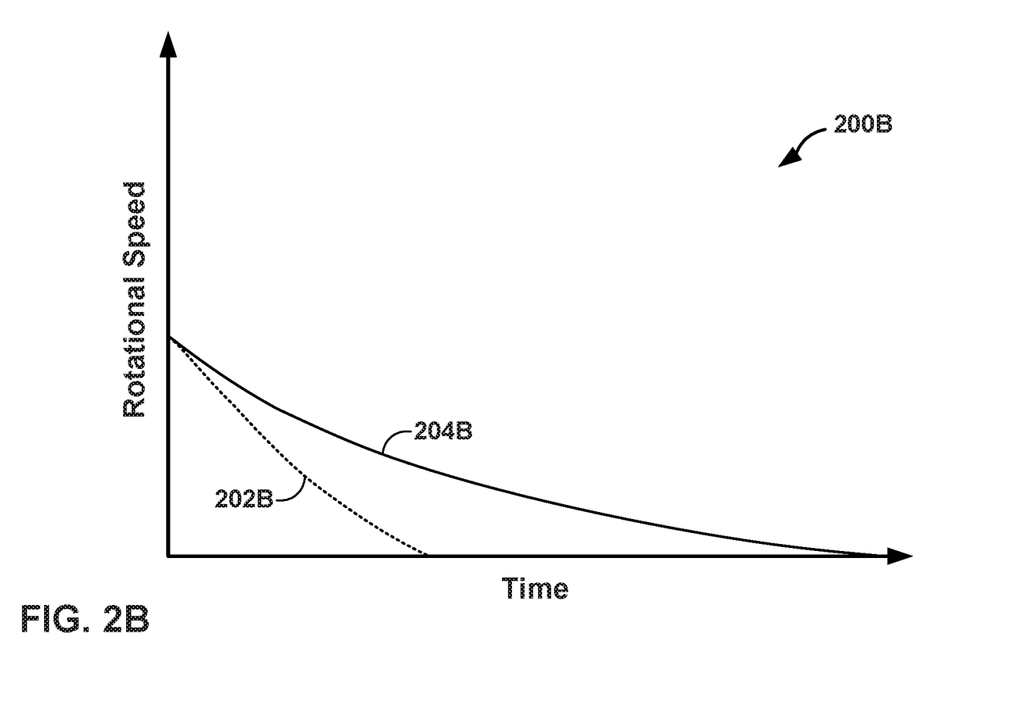

FIGS. 2A and 2B are graphs illustrating changes in rotational speed as a function of time, in accordance with one or more techniques of this disclosure. Graph 200A of FIG. 2A and graph 200B of FIG. 2B illustrate example relationships between rotational speed of an electric machine and time for various operational states of a disconnect device between the electric machine and a rotating device. Plots 202A and 202B (collectively "plots 202") illustrate example relationships between rotational speed of the electric machine (e.g., electric machine 8) and time when the disconnect device (e.g., disconnect device 6) is operating in accordance with the disengaged state. Plots 204A and 204B (collectively "plots 204") illustrate relationships between rotational speed of the electric machine (e.g., electric machine 8) and time when the disconnect device (e.g., disconnect device 6) is operating in accordance with the engaged state.

As discussed above, in some examples, electric machine 8 may output power to shaft 14 during the testing period. Plots 202A and 204A of graph 200A illustrate the scenarios where an electric machine outputs power during the testing period. As can be seen by comparing plot 202A and plot 204A, the rotational speed of the electric machine increases faster when the disconnect device is operating in accordance with the disengaged state (i.e., plot 202A) than when the disconnect device is operating in accordance with the engaged state (i.e., plot 204A). As discussed above, one case where an electric machine may output power during the testing period is where the electric machine is operating as a starter for a combustion motor. Further details of a case where the testing is performed during a start are discussed below with reference to FIG. 3.

As discussed above, in some examples, electric machine 8 may extract power from shaft 14 during the testing period. Plots 202B and 204B of graph 200B illustrate the scenarios where an electric machine extracts power during the testing period. As can be seen by comparing plot 202B and plot 204B, the rotational speed of the electric machine decreases faster when the disconnect device is operating in accordance with the disengaged state (i.e., plot 202B) than when the disconnect device is operating in accordance with the engaged state (i.e., plot 204B). As discussed above, one case where an electric machine may extract power during the testing period is where the electric machine is operating as a generator. Further details of a case where the testing is performed during a shutdown are discussed below with reference to FIG. 4.

Figure 3:
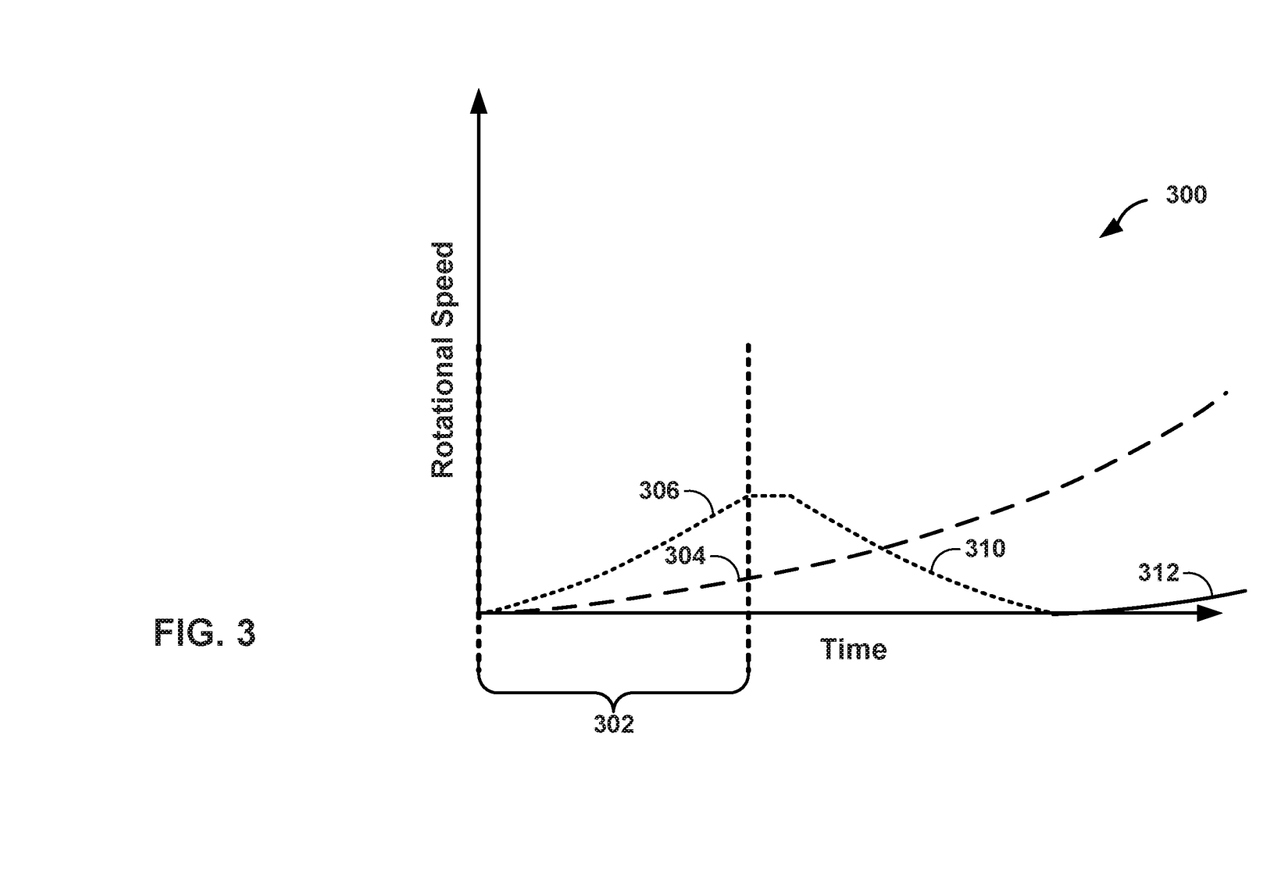
FIG. 3 is a graph illustrating changes in rotational speed of an electric machine as a function of time when testing of the electric machine is performed during a startup, in accordance with one or more techniques of this disclosure.

FIG. 3 is a graph illustrating changes in rotational speed of an electric machine as a function of time when testing of the electric machine is performed during a startup, in accordance with one or more techniques of this disclosure. Graph 300 of FIG. 3 illustrates example relationships between rotational speed of an electric machine and time for various operational states of a disconnect device between the electric machine and a rotating device during a startup of the rotating device. As discussed above, an electric machine may be used as a starter for a combustion motor (e.g., a startup of a combustion engine using rotational mechanical energy provided by the electric machine) and a controller (e.g., controller 10) may perform testing of the disconnect device (e.g., disconnect device 6) during a testing period that overlaps, at least in part, with the startup. For instance, as shown in FIG. 3, the controller may perform testing of the disconnect device during testing period 302.

At the beginning of the test (e.g., the start of testing period 302), the controller may command the disconnect device to operate in a disengaged state. With the disconnect device commanded to operate in the disengaged state, the electric machine may begin to output power (e.g., output rotational mechanical energy onto shaft 14). If the disconnect device has failed and is not operating in accordance with the disengaged state (i.e., is still coupling rotational mechanical energy between the electric machine and the rotating device), the rotational speed of the electric machine may rise slowly as shown by plot 304. However, if the disconnect device is operating in accordance with the disengaged state (i.e., is not coupling rotational mechanical energy between the electric machine and the rotating device), the rotational speed of the electric machine may rise more quickly as shown by plot 306 within testing period 302.

As discussed above, the controller may compare the change of rotational speed of the electric machine with an expected change in rotational speed of the electric machine to determine whether the disconnect device has failed. In the example of FIG. 3, the controller may determine that the disconnect device has failed where the actual change in rotational speed of the electric machine is less than a threshold (e.g., such that the actual change in rotational speed more closely matches plot 304 than plot 306). The controller may perform one or more actions responsive to determining that the disconnect device has failed during startup. As one example, the controller may cause the startup to be aborted (e.g., cause the electric machine to cease outputting power). As another example, the controller may cause one or more user interface devices (e.g., displays, speakers, lights, etc.) to output a warning that the disconnect device has failed. As another example, the controller may output a warning that the disconnect device has failed to one or more external devices (e.g., devices not included within a vehicle in which the electric machine is included).

Responsive to determining that the disconnect device has not failed, the controller may perform one or more actions to continue with the startup procedure. For instance, the controller may command the disconnect device to switch to operating in the engaged state such that rotational mechanical energy output by the electric machine may be used to start the combustion engine. In some examples, the controller may cause the electric machine to slow down (e.g., to extract power) before switching the disconnect device to the engaged state. For instance, the controller may cause the rotational speed of the electric machine to slow (as shown by plot 310) before switching the disconnect device to the engaged state (the rotational speed of electric machine after switching the disconnect device to the engaged state is shown by plot 312).

By performing the testing during the startup, the controller may enable discovery of failures of the disconnect device prior to substantial use of the disconnect device. For instance, where the system (e.g., system 2) is included on an aircraft, testing during startup may enable identification of failures of the disconnect device to be discovered on the ground, which may advantageously enhance safety.

Figure 4:
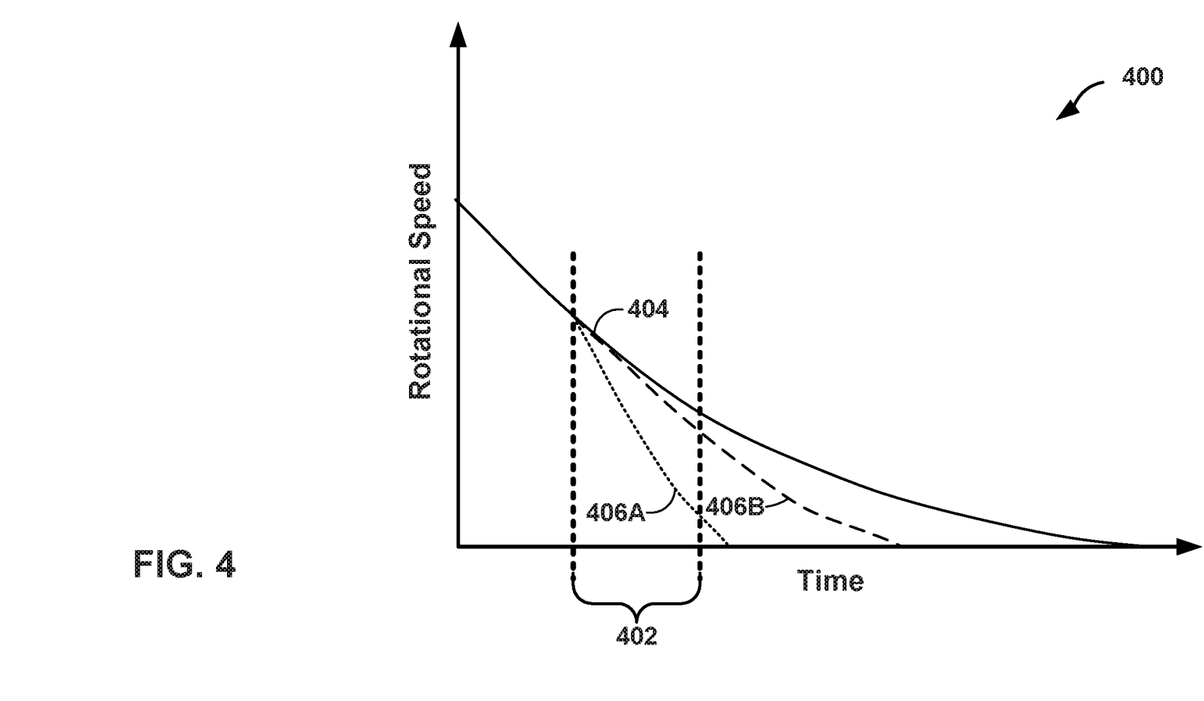
FIG. 4 is a graph illustrating changes in rotational speed of an electric machine as a function of time when testing of the electric machine is performed during a shutdown, in accordance with one or more techniques of this disclosure.

FIG. 4 is a graph illustrating changes in rotational speed of an electric machine as a function of time when testing of the electric machine is performed during a shutdown, in accordance with one or more techniques of this disclosure. Graph 400 of FIG. 4 illustrates example relationships between rotational speed of an electric machine and time for various operational states of a disconnect device between the electric machine and a rotating device during a shutdown of the rotating device. As discussed above, an electric machine may be used as a generator that generates electrical power using rotational mechanical energy produced by a combustion motor and a controller (e.g., controller 10) may perform testing of the disconnect device (e.g., disconnect device 6) during a testing period that overlaps, at least in part, with the shutdown. For instance, as shown in FIG. 4, the controller may perform testing of the disconnect device during testing period 402.

At the beginning of the test (e.g., the start of testing period 402), the controller may command the disconnect device to operate in a disengaged state. In some examples, the controller may begin the test near the end of a spooldown of the combustion motor. With the disconnect device commanded to operate in the disengaged state, the electric machine may extract power (e.g., extract rotational mechanical energy from shaft 14). If the disconnect device has failed and is not operating in accordance with the disengaged state (i.e., is still coupling rotational mechanical energy between the electric machine and the rotating device), the rotational speed of the electric machine may fall slowly as shown by plot 404. However, if the disconnect device is operating in accordance with the disengaged state (i.e., is not coupling rotational mechanical energy between the electric machine and the rotating device), the rotational speed of the electric machine may fall more quickly as shown by either plot 406A or 406B (406A illustrates an example where the electric machine is operated in short circuit and 406B illustrates an example where the electric machine is operated in open circuit). Other options include changing the deceleration of the electric machine by for example applying open and closed circuit to change the braking of the machine to ensure the disconnected state can be identified. Another option would be to disconnect the electrical machine and then power the electric machine as a motor for a period of time to change the deceleration rate or accelerate the electric machine to ensure the disconnect state can be identified. In some tests, the electric machine may be operated in a single state of open circuit, closed circuit, and motor for the duration of the test. In other tests, the electric machine may be sequentially operated in various states. For instance, during a particular test, the electric machine may initially be operated in the open circuit state, then operate in the closed circuit state, and then operate as a motor. The controller may monitor the speed and other aspects of the electric machine throughout all of the states and determine a health of the electric machine based on the monitoring. For instance, the controller may determine machine mechanical plus windage and iron losses versus copper losses of the electric machine based on acceleration rates (e.g., machine spooldown rates) after disconnected from the rotating device by applying crowbar and also open circuit, causing the electric machine to operate as a motor, or by monitoring the output current of the electric machine.

As discussed above, the controller may compare the change of rotational speed of the electric machine with an expected change in rotational speed of the electric machine to determine whether the disconnect device has failed. In the example of FIG. 4, the controller may determine that the disconnect device has failed where the actual change in rotational speed of the electric machine is greater than a threshold (e.g., such that the actual change in rotational speed more closely matches plot 404 than plot 406). The controller may perform one or more actions responsive to determining that the disconnect device has failed during shutdown. As one example, the controller may prevent subsequent startups from being initiated. As another example, the controller may cause one or more user interface devices (e.g., displays, speakers, lights, etc.) to output a warning that the disconnect device has failed. As another example, the controller may output a warning that the disconnect device has failed to one or more external devices (e.g., devices not included within a vehicle in which the electric machine is included).

Responsive to determining that the disconnect device has not failed, the controller may perform one or more actions to continue with the shutdown procedure. For instance, the controller may command the electric machine to continue to extract power. By performing the testing during the shutdown, the controller may enable failures of the disconnect device to be addressed (e.g., repair or replacement of the disconnect device) prior to a next use of the system (e.g., system 2). This may advantageously increase an uptime and/or an availability of the system.

Figure 5:
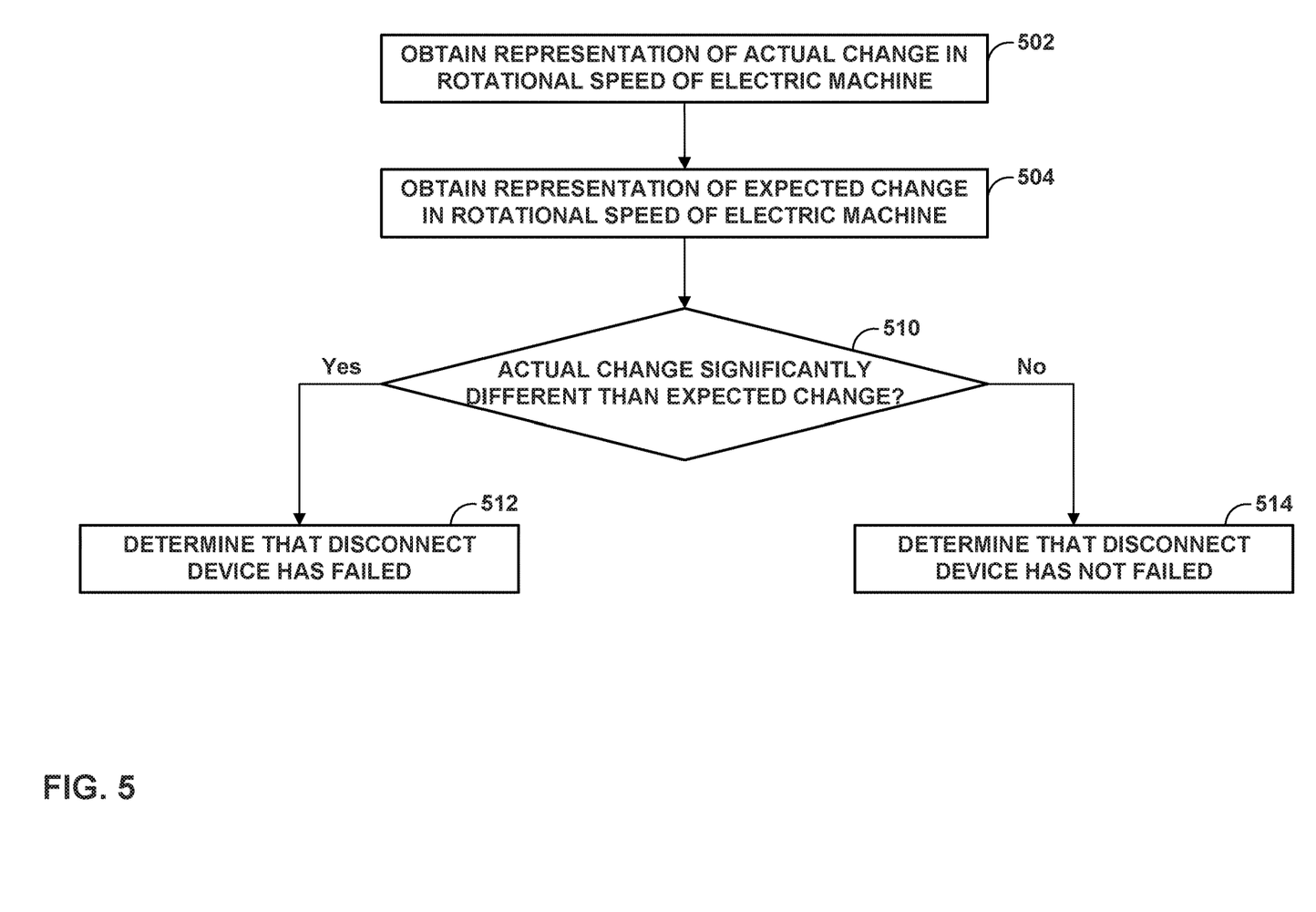
FIG. 5 is a flowchart illustrating an example process for testing operation of a disconnect device between an electric machine and a rotating device, in accordance with one or more techniques of this disclosure.

FIG. 5 is a flowchart illustrating an example process for testing operation of a disconnect device between an electric machine and a rotating device, in accordance with one or more techniques of this disclosure. The techniques of FIG. 5 may be performed by components of a controller, such as controller 10 of FIG. 1.

Controller 10 may obtain a representation of a change in rotational speed of an electric machine (502). For instance, as discussed above, controller 10 may obtain a change in rotational speed of electric machine 8 (e.g., an actual acceleration) from one or more speed sensors attached to, or embedded in, electric machine 8 or shaft 14. As one example, to obtain the representation of the change in rotational speed of the electric machine, controller 10 may obtain a rotational speed of electric machine 8 at a first time; obtain a rotational speed of electric machine 8 at a second time that is after the first time; and determine, based on a difference between the rotational speed of electric machine 8 at the first time and the rotational speed of electric machine 8 at the second time, the change in rotational speed of electric machine 8. Where electric machine 8 is configured to operate as an electrical generator, electric machine 8 may operate in crowbar (shorted) and/or open circuit generator modes during the testing or used as a motor (e.g., current supplied to electric machine 8). When operating in crowbar, electric machine 8 may decelerate at a much faster rate than when operating in open circuit.

Controller 10 may obtain a representation of an expected change in rotational speed of the electric machine (504). For instance, controller 10 may obtain, from memory, a threshold change in rotational speed (e.g., an expected acceleration) this can be from previously recorded data with an operational disconnect device or from models of the rotational system representing the engaged and disengaged states. In some examples, controller 10 may obtain different thresholds (i.e., different values for the expected change in speed) for different states of the disconnect device. For instance, controller 10 may obtain a first expected acceleration value when the disconnect device is set to operate in the engaged state and obtain a second expected acceleration value when the disconnect device is set to operate in the disengaged state.

Controller 10 may determine whether the disconnect device has failed based on the representation of the expected change in rotational speed of the electric machine and the representation of the actual change in rotational speed of the electric machine. For instance, controller 10 may determine whether the actual change in rotational speed is significantly different than the expected change in rotational speed (510). In some examples, controller 10 may determine that the actual change in rotational speed is significantly different than the expected change in rotational speed where the actual change in rotational speed is not within a threshold (e.g., 5%, 10%, 25%) of the expected change in rotational speed.

Responsive to determining that the actual change in rotational speed is significantly different than the expected change in rotational speed ("Yes" branch of 510), controller 10 may determine that the disconnect device has failed (512). Responsive to determining that the actual change in rotational speed is not significantly different than the expected change in rotational speed ("Yes" branch of 510), controller 10 may determine that the disconnect device has not failed (514).

In some examples, the system may include a speed sensor configured to sense a rotational speed of the rotating device. In some of such examples, controller 10 may be able to determine whether the disconnect device has failed based on a comparison between the rotational speed of the rotating device and the rotational speed of the electric machine. For instance, where the disconnect device is commanded to operate in the engaged state, controller 10 may determine that the disconnect device has not failed where the rotational speed of the rotating device matches (e.g., is equal to) the rotational speed of the electric machine. Similarly, where the disconnect device is commanded to operate in the engaged state, controller 10 may determine that the disconnect device has failed where the rotational speed of the rotating device does not match the rotational speed of the electric machine.

However, in some examples, the speed sensor of the rotating device may only be able to sense the rotational speed of the rotating device above a speed threshold. For instance, if the rotational speed of the rotating device is below the threshold, the speed sensor of the rotating device may not be able to accurately measure the rotational speed of the rotating device. As such, when the rotational speed of the rotating device is below the speed threshold (as it may be during shutdown), it may not be possible to determine whether the disconnect device has failed based on the rotational speed of the rotating device as measured by the speed sensor of the rotating device.

In accordance with one or more techniques of this disclosure and as discussed above, controller 10 may test operation of the disconnect device based on the rotational speed of the electric machine while the rotational speed of the rotating device is less than a threshold speed at which a speed sensor of the rotating device can measure the rotational speed of the rotating device. In this way, controller 10 may test operation of the disconnect device without using any direct measurement of the rotational speed of the rotating device). Also in this way, controller 10 may test operation of the disconnect device in response to determining that a speed sensor of the rotating device has failed.

In some examples, controller 10 may test operation of one or both of the electric machine and the rotating device. For instance, where controller 10 determines that the disconnect device has not failed (e.g., is functioning properly), controller 10 may use the disconnect device to determine whether one or both of the electric machine and the rotating device have seized. To determine whether the electric machine has seized, controller 10 may cause the electric machine to output power (e.g., onto shaft 14) while the disconnect device operates in the disengaged mode. If the rotational speed of electric machine does not increase, controller 10 may determine that the electric machine has seized. Similarly, if the rotational speed of the electric machine does increase, controller 10 may determine that the electric machine has not seized.

To determine whether the rotating device has seized, controller 10 may cause the electric machine to output power (e.g., onto shaft 14) while the disconnect device operates in the engaged mode. If the rotational speed of electric machine does not increase, controller 10 may determine that the rotating device has seized (e.g., where controller 10 has already determined that the electric machine has not seized). Similarly, if the rotational speed of the electric machine does increase, controller 10 may determine that the rotating device has not seized.

Controller 10 may test other aspects (e.g., determine one or more operational characteristics) of the electric machine and the rotating device (e.g., in addition to, or in place of, identifying seizure). Other aspects include efficiency, losses, etc. As one example, controller 10 may distinguish between load and low electric machine efficiency. As another example, controller 10 may establish electric machine health and losses without influence of the rotating device. For instance, controller 10 may observe electric machine acceleration at relatively low torque (e.g., where influence of electric machine health, such as bearing problems or rotor rubbing may be more magnified).

In some examples, controller 10 may determine one or more operational characteristics of the electric machine based on an output current or a voltage of the electric machine. For instance, controller 10 may determine machine mechanical plus windage and iron losses versus copper losses of the electric machine based on acceleration rates (e.g., machine spooldown rates) after disconnected from the rotating device by applying crowbar and also open circuit, causing the electric machine to operate as a motor, or by monitoring the output current of the electric machine.

The techniques of this disclosure further enable independent maintenance and/or health checks/testing of the electrical machine (e.g., independent of influence of the rotating device). For instance, controller 10 may test one or more operational characteristics of the electric machine while the disconnect device operates in the disengaged state. As one example, controller 10 may perform a generator health check by monitoring acceleration/deceleration of the electric machine first with generator open circuit and then with generator output closed circuit (both with the disconnect device disengaged).

Figure 6:
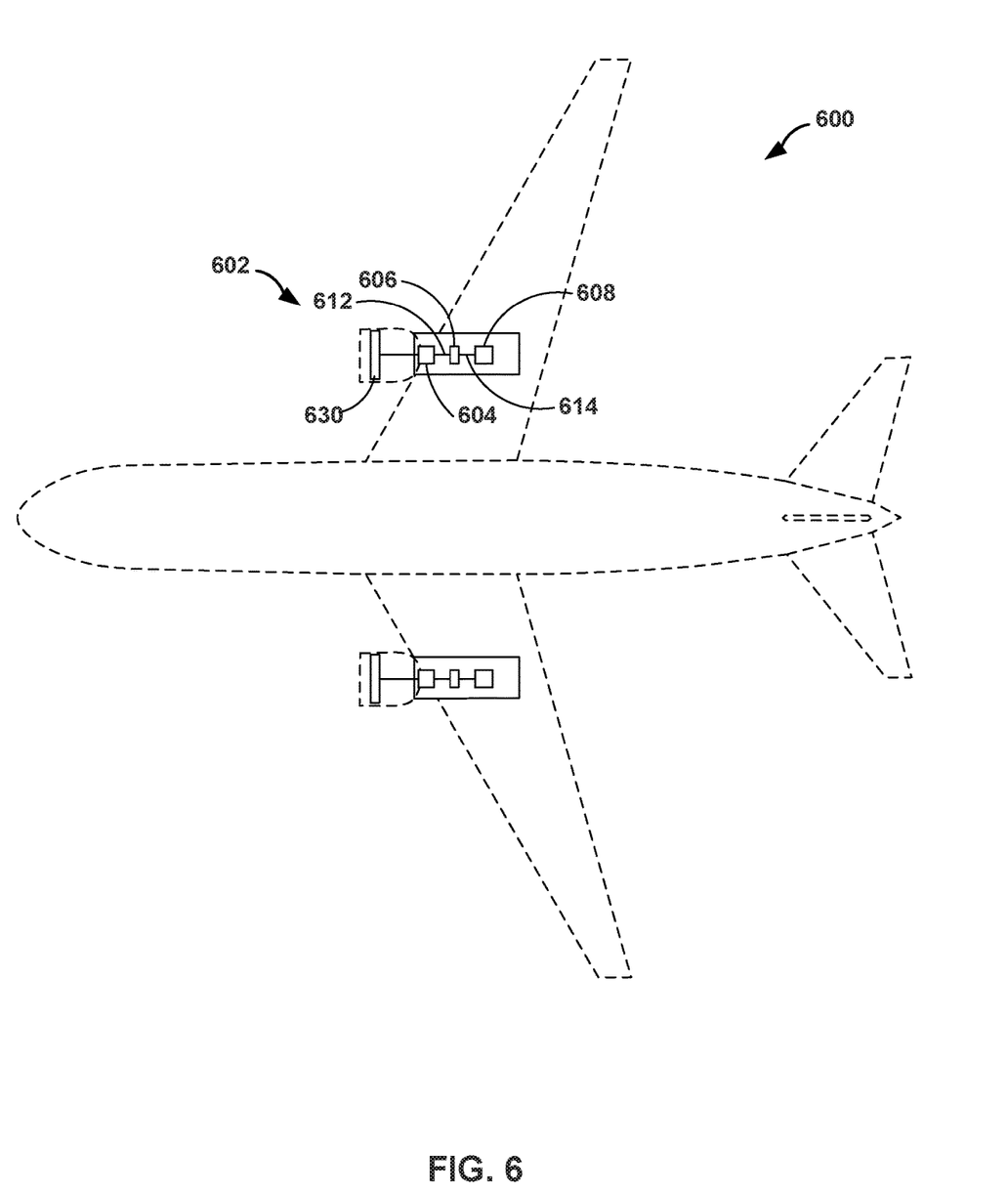
FIG. 6 is a conceptual diagram of a vehicle 600 that includes an electric machine connected to a rotating device via a disconnect device, in accordance with one or more techniques of this disclosure.

FIG. 6 is a conceptual diagram of a vehicle 600 that includes an electric machine connected to a rotating device via a disconnect device, in accordance with one or more techniques of this disclosure. In some examples, vehicle 600 includes an aircraft. In other examples, vehicle 600 may include any type of combustion engine-powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 600 may be manned, semiautonomous, or autonomous.

As shown in FIG. 6, vehicle 600 may include propulsion system 602. In some examples, propulsion system 602 may include a combustion engine, such as a gas-turbine engine. Propulsion systems that include gas-turbine engines may include one or more components configured to start the gas-turbine engines. One example of such a component is an air starter. Another example of such a component is an electric starter/generator (ESG).

Gas turbine air starters are typically attached to an engine accessory gearbox and include an over-running clutch to disconnect from the gearbox once the starter air source is removed. If this clutch fails and the starter remains engaged there is typically not a sensor to detect this condition. This failure mode could result in starter rotor blade failure or disk burst, which may be undesirable.

Gas turbine electric starter/generators (ESG) are typically attached to the engine accessory gearbox directly and, in the past, have not included a disconnect mechanism. ESGs are typically field wound generators. If there is a fault within the generation system, the field current can be removed externally and the generator will no longer produce power or voltage.

New gas turbine ESGs will likely be permanent magnet machines because of the improved power density and efficiency of these machines. One drawback of this machine topology is that if there is a fault in the generation system, the voltage cannot be stopped without additional features. If the fault is upstream of a circuit breaker then the generator will continue to feed current into the fault. One method to accommodate this failure mode is to add a disconnect device (e.g., a clutch or brake) to disconnect the ESG from the gearbox. Once the generator reaches zero rpm it will no longer create voltage. This disconnect device may be considered a safety protection that requires frequent testing up to once per flight. Because of this a means to test this automatically is preferable.

As discussed above and in accordance with one or more techniques of this disclosure, a system may perform an automatic self-test to determine whether a disconnect device is operating properly. As shown in FIG. 6, propulsion system 602 includes disconnect device 606 that is coupled to electric machine 608 via shaft 614 and coupled to combustion motor 604 via shaft 612 (combustion motor is connected to, and drives propulsor 630), In the example, of FIG. 6, a controller included in propulsion system 602 may perform a test to determine whether disconnect device 606 is operating properly.

The following examples may illustrate one or more aspects of the disclosure:

EXAMPLE 1

A system comprising: an electric machine; a rotating device; a disconnect device controllable to operate in a plurality of states, wherein, when operating in an engaged state of the plurality of states, the disconnect device is configured to couple rotational mechanical energy between the electric machine and the rotating device, and wherein, when operating in a disengaged state of the plurality of states, the disconnect device is not configured to couple rotational mechanical energy between the electric machine and the rotating device; and a controller configured to test operation of the disconnect device, wherein, to test operation of the disconnect device, the controller is configured to: obtain a representation of a change in rotational speed of the electric machine; obtain a representation of an expected change in rotational speed of the electric machine; and determine, based on the obtained representation of the change in rotational speed of the electric machine and the representation of an expected change in rotational speed of the electric machine, whether the disconnect device has failed.

EXAMPLE 2

The system of example 1, wherein, to determine whether the disconnect device is operating in accordance with the determined current state, the controller is configured to: determine that the disconnect device has not failed in response to determining that the representation of the expected change in rotational speed of the electric machine is within a threshold of the obtained representation of the change in rotational speed of the electric machine.

EXAMPLE 3

The system of any combination of examples 1-2, wherein the controller is further configured to: determine that the disconnect device has failed in response to determining that the representation of the expected change in rotational speed of the electric machine is not within the threshold of the obtained representation of the change in rotational speed of the electric machine.

EXAMPLE 4

The system of any combination of examples 1-3, wherein, to obtain the representation of the change in rotational speed of the electric machine, the controller is configured to: obtain a rotational speed of the electric machine at a first time; obtain a rotational speed of the electric machine at a second time that is after the first time; and determine, based on a difference between the rotational speed of the electric machine at the first time and the rotational speed of the electric machine at the second time, the change in rotational speed of the electric machine.

EXAMPLE 5

The system of any combination of examples 1-4, wherein the system is included in a vehicle, and wherein the rotating device comprises a component of a propulsion system of the vehicle.

EXAMPLE 6

The system of example 5, wherein the component comprises a propulsor.

EXAMPLE 7

The system of example 6, wherein the electric machine comprises an electrical generator configured to generator power for one or more devices included in the vehicle.

EXAMPLE 8

The system of example 5, wherein the component comprises a combustion motor.

EXAMPLE 9

The system of example 8, wherein the controller is configured to test operation of the disconnect device during one or both of startup of the combustion motor and shutdown of the combustion motor.

EXAMPLE 10

The system of any combination of examples 1-9, wherein the controller is further configured to test operation of one or both of the electric machine and the rotating device based on determining that the disconnect device has not failed.

EXAMPLE 11

The system of example 11, wherein, to test operation of one or both of the electric machine and the rotating device, the controller is configured to determine whether one or both of the electric machine and the rotating device have seized.

EXAMPLE 12

The system of example 10, wherein the electrical machine comprises an electrical generator, and wherein the controller is configured to determine one or more operational characteristics of the electrical generator by at least: obtaining a measurement of an output current of the electrical generator; and determining, based on the measurement of the output current, the one or more operational characteristics of the electrical generator.

EXAMPLE 13

The system of any combination of examples 1-12, wherein the controller is further configured to: determine a current state of the disconnect device, wherein, to obtain the representation of the expected change in rotational speed of the electrical machine, the controller is configured to obtain the representation of the expected change in rotational speed of the electrical machine based on the determined current state of the disconnect device.

EXAMPLE 14

The system of any combination of examples 1-13, wherein the controller is further configured to cause the electric machine to output or extract power while testing operation of the disconnect device.

EXAMPLE 15

The system of any combination of examples 1-14, wherein the controller is further configured to operate the electric machine in open circuit, crowbar, or as a motor while the disconnect device is operating in the disengaged state.

EXAMPLE 16

The system of example 15, wherein the controller is further configured to determine a health of the electric machine.

EXAMPLE 17

The system of example 16, wherein, to determine the health of the electric machine, the controller is configured to determine the health of the electric machine while testing operation of the disconnect device.

EXAMPLE 18

The system of any combination of examples 15-17, wherein, to determine the health of the electric machine, the controller is configured to determine one or more of mechanical losses, windage losses, and iron losses of the electric machine.

EXAMPLE 19

The system of any combination of examples 1-18, wherein the controller is configured to test operation of the disconnect device in response to determining that a speed sensor of the rotating device has failed.

EXAMPLE 20

The system of any combination of examples 1-19, wherein the controller is configured to test operation of the disconnect device when a rotational speed of the rotating device is less than a threshold speed at which a speed sensor of the rotating device can measure the rotational speed of the rotating device.

EXAMPLE 21

A method comprising: obtaining a representation of a change in rotational speed of an electric machine; obtaining a representation of an expected change in rotational speed of the electric machine; and determining, based on the obtained representation of the change in rotational speed of the electric machine and the representation of an expected change in rotational speed of the electric machine, whether a disconnect device has failed, wherein, when operating in an engaged state, the disconnect device is configured to couple rotational mechanical energy between the electric machine and a rotating device, and wherein, when operating in a disengaged state, the disconnect device is not configured to couple rotational mechanical energy between the electric machine and the rotating device.

EXAMPLE 22

The method of example 21, further comprising: determining that the disconnect device has not failed in response to determining that the representation of the expected change in rotational speed of the electric machine is within a threshold of the obtained representation of the change in rotational speed of the electric machine; and determining that the disconnect device has failed in response to determining that the representation of the expected change in rotational speed of the electric machine is not within the threshold of the obtained representation of the change in rotational speed of the electric machine.

EXAMPLE 23

A computer-readable storage medium storing instructions that, when executed, cause a controller to: obtain a representation of a change in rotational speed of an electric machine; obtain a representation of an expected change in rotational speed of the electric machine; and determine, based on the obtained representation of the change in rotational speed of the electric machine and the representation of an expected change in rotational speed of the electric machine, whether a disconnect device has failed, wherein, when operating in an engaged state, the disconnect device is configured to couple rotational mechanical energy between the electric machine and a rotating device, and wherein, when operating in a disengaged state, the disconnect device is not configured to couple rotational mechanical energy between the electric machine and the rotating device.

EXAMPLE 24

A system comprising any combination of examples 1-23.

Various examples have been described. These and other examples are within the scope of the following claims.

What is claimed is:

1. A system comprising:
an electric machine;
a rotating device;
a disconnect device controllable to operate in a plurality of states, wherein, when operating in an engaged state of the plurality of states, the disconnect device is configured to couple rotational mechanical energy between the electric machine and the rotating device, and wherein, when operating in a disengaged state of the plurality of states, the disconnect device is not configured to couple rotational mechanical energy between the electric machine and the rotating device; and
a controller configured to test operation of the disconnect device, wherein, to test operation of the disconnect device, the controller is configured to:
obtain a representation of a change in rotational speed of the electric machine;
obtain a representation of an expected change in rotational speed of the electric machine; and
determine, based on the obtained representation of the change in rotational speed of the electric machine and the representation of an expected change in rotational speed of the electric machine, whether the disconnect device has failed, wherein the system is included in a vehicle, and wherein the rotating device comprises a combustion motor of a propulsion system of the vehicle.

2. The system of claim 1, wherein, to determine whether the disconnect device is operating in accordance with the determined current state, the controller is configured to:
determine that the disconnect device has not failed in response to determining that the representation of the expected change in rotational speed of the electric machine is within a threshold of the obtained representation of the change in rotational speed of the electric machine.

3. The system of claim 2, wherein the controller is further configured to:
determine that the disconnect device has failed in response to determining that the representation of the expected change in rotational speed of the electric machine is not within the threshold of the obtained representation of the change in rotational speed of the electric machine.

4. The system of claim 1, wherein, to obtain the representation of the change in rotational speed of the electric machine, the controller is configured to:
obtain a rotational speed of the electric machine at a first time;
obtain a rotational speed of the electric machine at a second time that is after the first time; and
determine, based on a difference between the rotational speed of the electric machine at the first time and the rotational speed of the electric machine at the second time, the change in rotational speed of the electric machine.

5. The system of claim 1, wherein the electric machine comprises an electrical generator configured to generate power for one or more devices included in the vehicle.

6. The system of claim 1, wherein the controller is configured to test operation of the disconnect device during one or both of startup of the combustion motor and shutdown of the combustion motor.

7. The system of claim 1, wherein the controller is further configured to test operation of one or both of the electric machine and the rotating device based on determining that the disconnect device has not failed.

8. The system of claim 7, wherein, to test operation of one or both of the electric machine and the rotating device, the controller is configured to determine whether one or both of the electric machine and the rotating device have seized.

9. The system of claim 7, wherein the electrical machine comprises an electrical generator, and wherein the controller is configured to determine one or more operational characteristics of the electrical generator by at least:
obtaining a measurement of an output current of the electrical generator; and
determining, based on the measurement of the output current, the one or more operational characteristics of the electrical generator.

10. The system of claim 1, wherein the controller is further configured to:
determine a current state of the disconnect device,
wherein, to obtain the representation of the expected change in rotational speed of the electrical machine, the controller is configured to obtain the representation of the expected change in rotational speed of the electrical machine based on the determined current state of the disconnect device.

11. The system of claim 1, wherein the controller is further configured to cause the electric machine to output or extract power while testing operation of the disconnect device.

12. The system of claim 1, wherein the controller is further configured to operate the electric machine in open circuit, crowbar, or as a motor while the disconnect device is operating in the disengaged state.

13. The system of claim 1, wherein the controller is configured to determine a health of the electric machine while testing operation of the disconnect device.

14. The system of claim 13, wherein, to determine the health of the electric machine, the controller is configured to determine one or more of mechanical losses, windage losses, and iron losses of the electric machine.

15. The system of claim 1, wherein the controller is configured to test operation of the disconnect device in response to determining that a speed sensor of the rotating device has failed.

16. The system of claim 1, wherein the controller is configured to test operation of the disconnect device when a rotational speed of the rotating device is less than a threshold speed at which a speed sensor of the rotating device can measure the rotational speed of the rotating device.

17. A method comprising:
- obtaining a representation of a change in rotational speed of an electric machine;
- obtaining a representation of an expected change in rotational speed of the electric machine; and
- determining, based on the obtained representation of the change in rotational speed of the electric machine and the representation of an expected change in rotational speed of the electric machine, whether a disconnect device has failed, wherein, when operating in an engaged state, the disconnect device is configured to couple rotational mechanical energy between the electric machine and a rotating device, wherein, when operating in a disengaged state, the disconnect device is not configured to couple rotational mechanical energy between the electric machine and the rotating device, and wherein the rotating device comprises a combustion motor of a propulsion system of a vehicle.

18. A computer-readable storage medium storing instructions that, when executed, cause a controller to:
- obtain a representation of a change in rotational speed of an electric machine;
- obtain a representation of an expected change in rotational speed of the electric machine; and
- determine, based on the obtained representation of the change in rotational speed of the electric machine and the representation of an expected change in rotational speed of the electric machine, whether a disconnect device has failed, wherein, when operating in an engaged state, the disconnect device is configured to couple rotational mechanical energy between the electric machine and a rotating device, wherein, when operating in a disengaged state, the disconnect device is not configured to couple rotational mechanical energy between the electric machine and the rotating device, and wherein the rotating device comprises a combustion motor of a propulsion system of a vehicle.

* * * * *